H. BLUMENBERG, Jr.
PROCESS OF MAKING BORIC ACID AND SODIUM BORATE.
APPLICATION FILED DEC. 4, 1917.
1,295,958.
Patented Mar. 4, 1919.
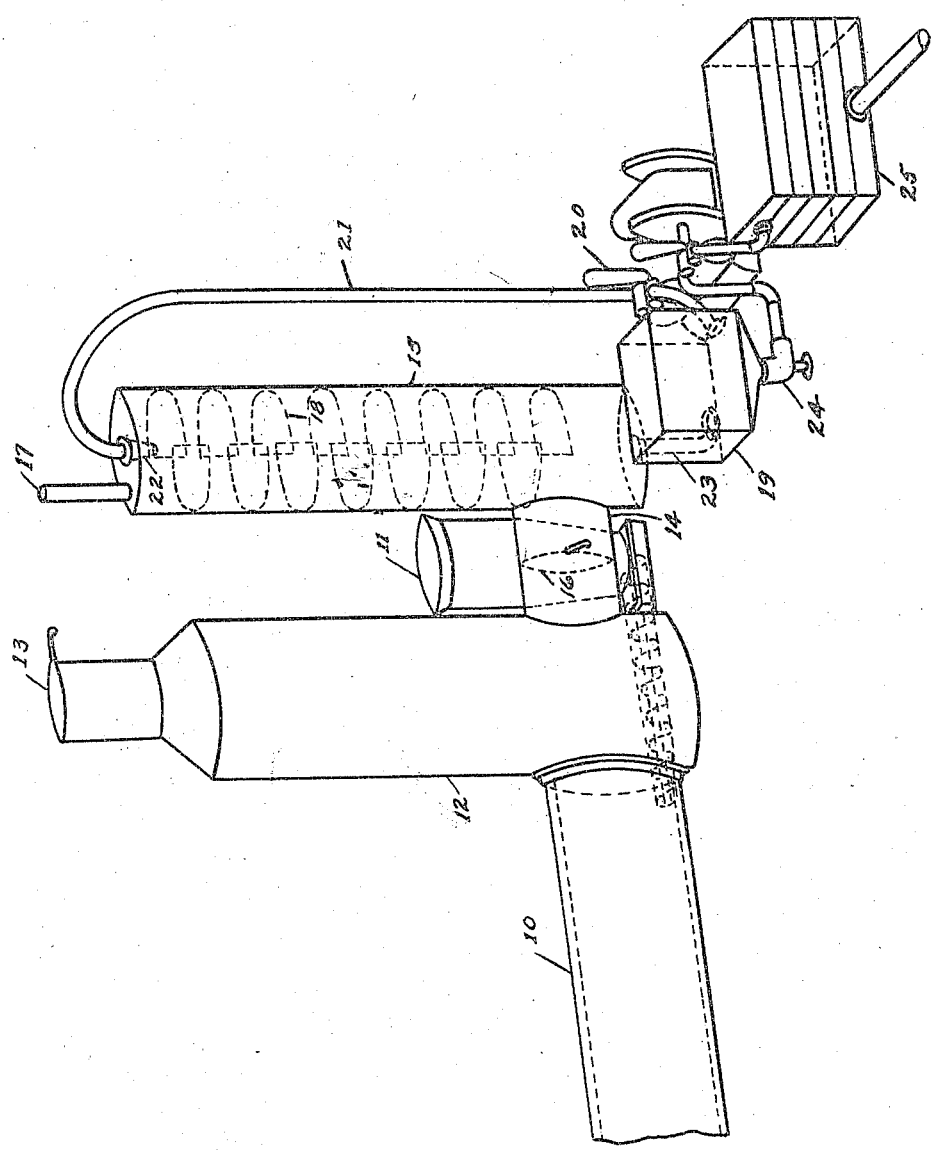
Inventor:
Henry Blumenberg, Jr.,
by Hazard & Miller
Attys.

UNITED STATES PATENT OFFICE.

HENRY BLUMENBERG, JR., OF LOS ANGELES, CALIFORNIA, ASSIGNOR TO CHEMICAL CONSTRUCTION COMPANY, OF LOS ANGELES, CALIFORNIA, A CORPORATION OF CALIFORNIA.

PROCESS OF MAKING BORIC ACID AND SODIUM BORATE.

1,295,958.

Specification of Letters Patent. Patented Mar. 4, 1919.

Application filed December 4, 1917. Serial No. 205,450.

*To all whom it may concern:*

Be it known that I, HENRY BLUMENBERG, Jr., a citizen of the United States, residing at Los Angeles, in the county of Los Angeles and State of California, have invented new and useful Improvements in Processes of Making Boric Acid and Sodium Borate, of which the following is a specification.

My invention relates to a process of recovering borax from waste gases of borax ore calcining apparatus to make boric acid and sodium borate.

A large quantity of borax is obtained from the treatment of calcium borate ores, such as colemanite, pandermite, and priceite, which are hydrous calcium borates. Some of these calcium borates contain as much as twenty molecules of water of crystallization and it is necessary, as a preliminary treatment of the borax ores, to subject them to calcination to expel the water of crystallization. As the ore is calcined it becomes extremely friable and fluffy and large quantities are lost, being carried along in the waste gases passing through the chimney and into the atmosphere. Not only is this loss considerable, the solid matter of the waste gases containing as much as forty to fifty per cent. of $B_2O_3$, but the dust that settles upon the surrounding land is a nuisance as it injures the vegetation.

Various methods, such as precipitating the borax ore dust by means of electricity, have been proposed, but to my knowledge none of these have been a commercial success for the reason that they are too expensive of installation and uncertain in operation.

I have invented a simple and inexpensive process of recovering the borax ore dust carried in the waste gases.

My invention consists in the steps of the process hereinafter described and claimed.

In the accompanying drawings which form a part of this specification, I have illustrated, by way of example, an apparatus suitable for carrying out my process.

In the drawings, 10 designates the stack end of a calcining apparatus which is here shown to be of the rotary cylindrical type suitable for calcining calcareous borax ores. 11 indicates a suitable hopper whereby the ore is fed into the stack end of the calcining apparatus 10. The waste gases enter the lower end of the stack or chimney 12 which, however, is only used when for any reason the precipitating apparatus hereinafter described is not in operation. 13 is a lid or damper normally closing the stack 12. 14 is a conduit for conveying the waste gases into a precipitating chamber or tower 15. 16 is a slide-valve whereby the conduit 14 may be closed. The tower 15 has an exit 17 at the top. A series of baffle plates 18, which are here shown arranged in staggered relation but which may be of any preferred construction, are provided in the interior of the tower 15. 19 is a tank from which, by means of a pump 20, a liquid may be pumped through pipe 21 to the top of the tower 15 and there sprayed by means of a nozzle 22, the liquid being retarded in its downward passage by the baffle plates 18 in the well-known manner, thereby allowing the same to become intimately mixed with the waste gases coming from the calcining apparatus 10. The liquid collecting at the bottom of the tower 15 is returned, by means of pipe 23, to the tank 19 which latter is provided with a valved outlet 24 whence the liquor may be conveyed to filter presses 25 for separating the liquid from the solid constituents.

In the operation of my process, I introduce a weak solution of sulfuric acid in the tank 19 and circulate the same by means of pump 20 through the precipitating tower 15. The liquid will, on contact with the waste gases carrying calcium borate, form calcium sulfate and boric acid which may be separated by means of the filter presses 25 at suitable intervals. In place of sulfuric acid, nitric acid may be used, forming calcium nitrate and boric acid, or a solution of sodium carbonate may be used in place of the acid, which will form calcium carbonate and a borate of sodium.

By the use of the acids and the sodium carbonate, I precipitate the greater portion of the solid constituents of the waste gases, thereby not only eliminating a nuisance but effecting a saving of the borax ore hitherto gone to waste.

I claim:

1. A process of treating waste gases containing borates in suspension, comprising treating said gases with an acid, thereby forming boric acid, and separating the boric acid from the mass.

2. A process of treating waste gases containing calcium borates in suspension, comprising treating said gases with an acid, thereby forming boric acid, and separating the boric acid from the mass.

3. A process of treating waste gases containing calcium borates in suspension, comprising treating said gases with sulfuric acid, thereby forming boric acid and calcium sulfate, and separating the boric acid from the mass.

In testimony whereof I have signed my name to this specification.

HENRY BLUMENBERG, Jr.

Copies of this patent may be obtained for five cents each, by addressing the "Commissioner of Patents, Washington, D. C."